March 27, 1962 | YOSHIRO MORIGUCHI | 3,027,502

SEMICONDUCTOR DEVICE

Filed July 8, 1960

INVENTOR
YOSHIRO MORIGUCHI
BY Mitchell & Bechert
ATTORNEYS

United States Patent Office 3,027,502

Patented Mar. 27, 1962

3,027,502

SEMICONDUCTOR DEVICE

Yoshiro Moriguchi, Tokyo, Japan, assignor to Nippon Electric Company Limited, Tokyo, Japan, a corporation of Japan Filed July 8, 1960, Ser. No. 41,654

5 Claims. (Cl. 317—235)

This invention relates to an electrical semiconductor device, and more particularly, it relates to the novel construction of a resilient electrode wire for use in such device.

One conventional type of semiconductor device, such as, a diode or transistor, utilizes a resilient metallic electrode, having a large modulus of elasticity. The electrode is shaped inherently to apply sufficient pressure between it and the semiconductive element so as to establish a good electrical connection.

In the conventional devices, the electrode is formed of a resilient conductive wire and shaped in the form of a U or S. The electrode-semiconductor assembly is generally sealed in a glass tube to protect it against the usual detrimental influences. In sealing the tube, the tube is subjected to a heat treatment which causes the metallic electrode to expand against the semiconductor and become deformed. After the heat treatment is completed and the temperature reduced, the electrode contracts. The metallic electrode therefore undergoes an annealing treatment and often loses its elastic properties causing a reduction in pressure between the electrode and the semiconductive element. The reduction in pressure often causes an open circuit in the device.

It is an object of this invention to provide a unique electrode construction which produces an increased pressure after heat treatment, rather than a reduced pressure as in the conventional devices.

In accordance with an aspect of the invention there is provided a semiconductive electrical component comprising a metallic electrode characterized by a bimetallic construction producing thermal contraction during the heat treatment and expansion upon cooling.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
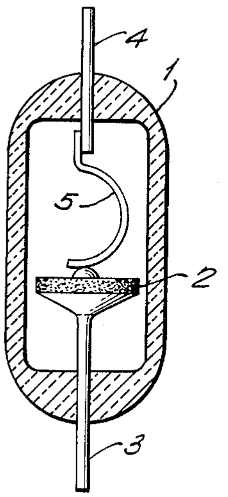
FIGURE 1 is a front sectional view of a glass sealed, pressure contact, semiconductor diode.

Referring to FIGURE 1, a pressure contact semiconductor diode is illustrated within an enclosure 1 of, for example, glass. The diode comprises a semiconductive element 2, lead-in wires 3 and 4 and a U-shaped bimetallic electrode 5. The electrode may also be S-shaped, however by way of example, a U-shaped electrode is illustrated. The wire 3 is electrically connected to the semiconductor element 2, and the wire 4 is welded or soldered to one end of the U-shaped electrode 5; the other end of the electrode 5 being in pressure contact with the semiconductor element 2.

Figure 2:
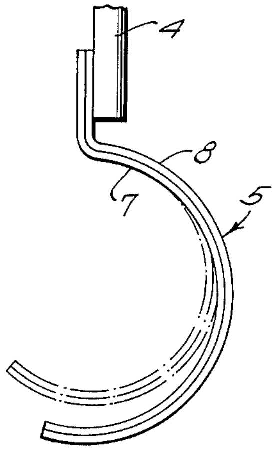
FIGURE 2 is a side view of the novel bimetallic electrode.

The electrode 5 is characterized by a bimetallic construction of metals 7 and 8 (FIG. 2) which are laminated together to produce a sharper bend when subjected to heat. The metal 7, therefore, has a low coefficient of thermal expansion, while the metal 8 has a higher coefficient of thermal expansion. Instead of the bilaminar construction, the electrode may be an alloy of metals of different thermal expansions to provide the same thermal reaction as the bilaminar construction.

The semiconductor assembly is placed within a glass envelope 1, and the glass envelope sealed hermetically by heat treatment.

The electrode is initially positioned so as to bear with the desired pressure against the semiconductor. When the electrode is subjected to the heat required for sealing the envelope, the electrode curve contracts as suggested by the dotted line in FIG. 2. Upon cooling, the electrode returns to its original shape and bears against the semiconductor with the predetermined pressure.

Figure 3:
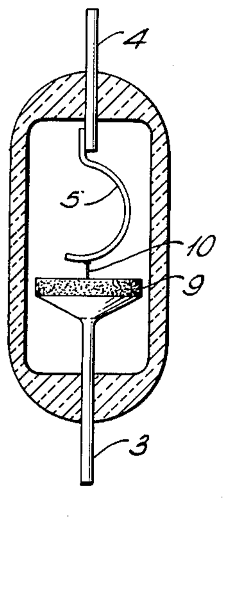
FIGURE 3 is a front sectional view of a glass sealed, point contact, semiconductor diode; and, FIGURE 4 is a front sectional view of a glass sealed transistor.

In FIG. 3, a point contact device is illustrated comprising a catwhisker 10 welded or soldered to the electrode 5. The electrode performs the same function as described above in connection with FIGS. 1 and 2.

Figure 4:
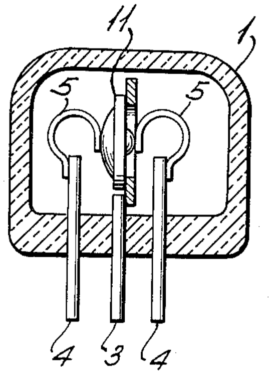

In FIG. 4, a transistor is illustrated wherein the bimetallic electrodes 5 make contact with the emitter and collector sides of the semiconductor element 11. The base electrode is shown as a ring shaped member 12, which is now conventional.

It is to be understood, of course, that the invention has a broad utility beyond the embodiments described above. For example, the electrode may be mounted while in a heated condition so that after it cools it bears against the semiconductor with desired pressure.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. An electrical device comprising a semiconductor element, a lead-in wire connected to said element, and curved bimetallic electrode means pressure-connected to said semiconductor element, the metals of said bimetallic electrode having different coefficients of thermal expansion and the metals being disposed so that while subjected to heat the radius of curvature of said electrode is decreased, thereby decreasing the pressure between said electrode and said semiconductor element.

2. The device according to claim 1, wherein said bimetallic element comprises an alloy of metals having different coefficients of thermal expansion.

3. The device according to claim 1, wherein said bimetallic electrode means comprises a U-shaped bimetallic portion and a catwhisker connected at one end to said U shaped portion and connected at the other end by pressure only to said semiconductor element.

4. The device according to claim 1, wherein said semiconductor element comprises a transistor, said bimetallic electrode means being pressure-connected to one side of said element, a second bimetallic electrode means pressure-connected to the opposite side of said element, and a base electrode connected to said element.

5. A sealed semiconductor device, comprising a semiconductor element, a lead-in wire, a U-shaped bimetallic electrode connected at one end to said lead-in wire and connected at the other end by pressure only to said semiconductor element, the metals of said bimetallic electrode having different coefficients of thermal expansion and the metals being disposed so that while subjected to heat the radius of curvature of the U is decreased.

No references cited.